(12) United States Patent
Swamy et al.

(10) Patent No.: US 12,461,953 B1
(45) Date of Patent: Nov. 4, 2025

(54) AUTOMATIC USER CONSOLE QUESTION GENERATION

(71) Applicant: Amazon Technologies, Inc., Seattle, WA (US)

(72) Inventors: Sandesh Swamy, Seattle, WA (US); Rashmi Gangadharaiah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/752,410

(22) Filed: Jun. 24, 2024

(51) Int. Cl.
*G06F 16/3329* (2025.01)
*G06F 16/335* (2019.01)

(52) U.S. Cl.
CPC ........ *G06F 16/3329* (2019.01); *G06F 16/335* (2019.01)

(58) Field of Classification Search
None
See application file for complete search history.

(56) References Cited

U.S. PATENT DOCUMENTS

2020/0226311 A1* 7/2020 Ding .................. G01V 20/00
2020/0346093 A1* 11/2020 Ono .................. G06V 20/42

OTHER PUBLICATIONS

Duan et al.; "Question Generation for Question Answering"; Proceedings of the Conf. on Empirical Methods in Natural Language Processing; 2017; p. 866-874.
Du et al.; "Learning to Ask: Neural Question Generation for Reading Comprehension"; arXiv:1705.00106; Apr. 2017; 11 pages.
Kang et al.; "Let Me Know What to Ask: Interrogative-Word-Aware Question Generation"; arXiv:1910.13794; Oct. 2019; 9 pages.

* cited by examiner

*Primary Examiner* — Thu N Nguyen
(74) *Attorney, Agent, or Firm* — BakerHostetler

(57) ABSTRACT

A method includes accessing user trajectory information associated with a user account, wherein the user trajectory information corresponds to a first session, the first session including user interactions with a cloud computing provider, generating, by a large language model, a plurality of questions based on the user trajectory information, generating, for at least a subset of the plurality of questions, a plurality of answers corresponding to the at least the subset of the plurality of questions, wherein an answer of plurality of answers corresponds to a resource of the cloud computing provider, receiving, from a user device associated with the user account, an indication that the user account has started a second session, and responsive to receiving the indication, causing display of the at least the subset of the plurality of questions and corresponding answers on the user device.

20 Claims, 8 Drawing Sheets

AUTOMATIC USER CONSOLE QUESTION GENERATION

BACKGROUND

The rapid growth of cloud computing has led to an explosion in the number of services and features offered by cloud providers. As a result, the volume of documentation required to support these services has increased exponentially, creating a daunting task for users to navigate and find relevant information. The documentation, which is often scattered across numerous pages and links, is further complicated by its dynamic nature, with frequent updates and changes to services, features, and website architecture. This constant flux makes it challenging for users to keep pace with the latest information, leading to frustration and decreased productivity.

The consequences of this information overload are particularly pronounced for new users, who may struggle to find the most relevant information for their specific needs. The sheer volume of documentation, combined with its complexity and dynamism, may create a cognitive burden that can lead to user frustration, decreased adoption rates, and reduced overall satisfaction with cloud services. Moreover, the lack of a clear and intuitive navigation system may force users to invest significant time and effort in searching for information, which can be an obstacle to achieving their goals. This problem is further exacerbated by the fact that users may have to sift through multiple searches and tabs to find the information they need, leading to a suboptimal user experience.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

The description set forth below describes various configurations of the subject technology and is not intended to represent the only configurations in which the subject technology may be practiced. The appended drawings are incorporated herein and constitute a part of the description. The description includes specific details for the purpose of providing an understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

To address the challenges of information overload and navigation complexity in cloud services, aspects of the subject technology leverage the power of foundation models (e.g., large language models (LLMs)) to automatically generate personalized questions based on a user's trajectory information. The subject technology involves the integration of a specialized question generation system, fine-tuned on question generation datasets and cloud service-specific documentation, with a user's profile information and/or trajectory data. By combining these elements, the subject technology can generate context-specific questions that are relevant to a user's current service and resource usage, providing a more intuitive and efficient way to access relevant information. In some aspects of the subject technology, the generated questions may then be paired with links to the most relevant resources (e.g., webpages) that can answer the user's questions, or textual and/or visual representations of said resources, allowing for seamless navigation to the desired information. The subject technology may improve the way users interact with cloud services resources (e.g., documentation and/or configuration pages), reducing the cognitive burden of information overload and increasing overall user satisfaction.

Figure 1:
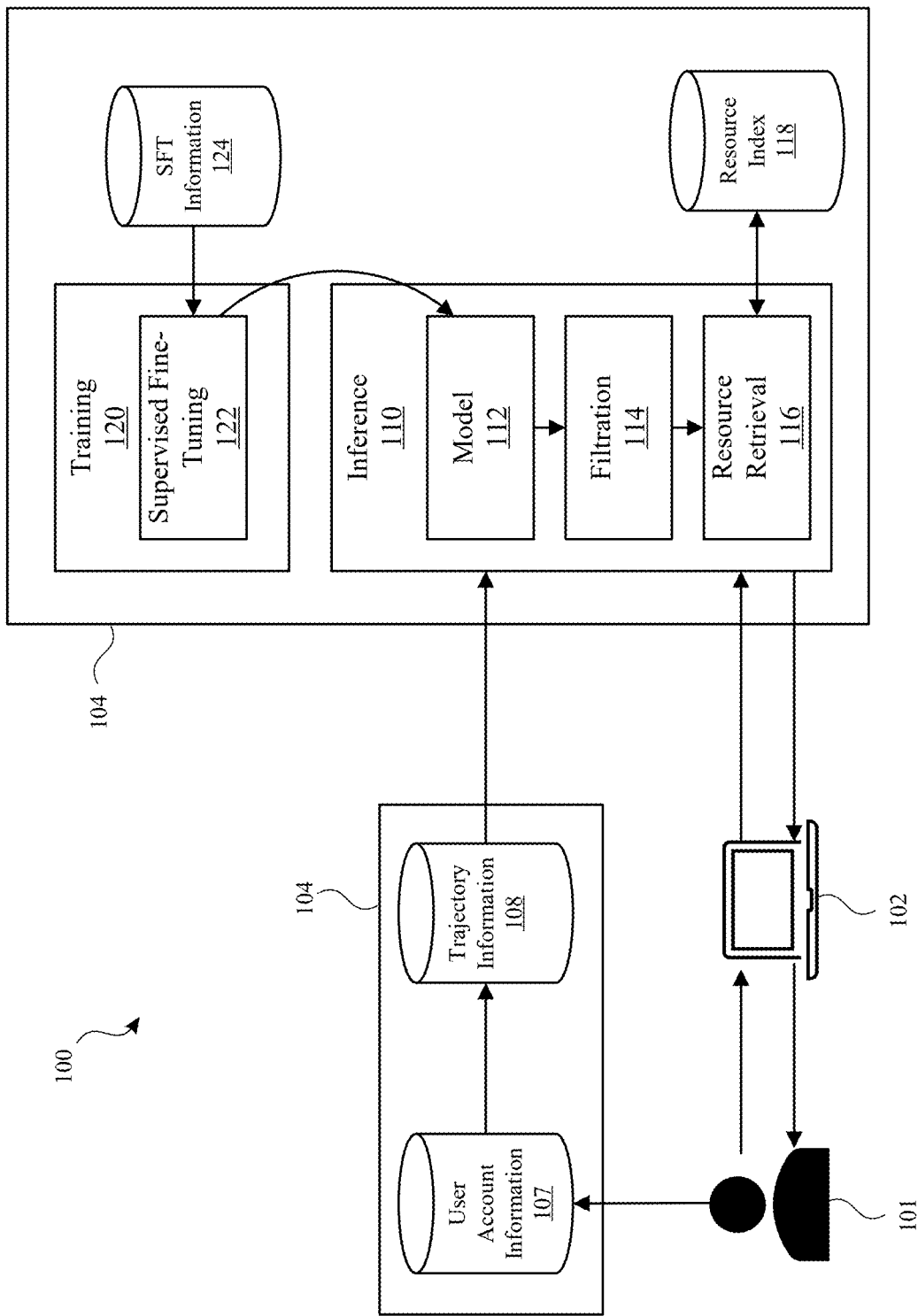
FIG. 1 illustrates a diagram of an example documentation question generation system, in accordance with one or more embodiments of the subject technology.

FIG. 1 illustrates a diagram of an example documentation question generation system 100, in accordance with one or more embodiments of the subject technology. The system 100 may be part of a cloud service provider and may include one or more servers, such as server 104. The server 104 may maintain user account information 107 and trajectory information 108, including user account information and trajectory information about the user 101. The server 104 may host and/or provide data to one or more user interfaces through which the user 101 may modify services, billing information, access documentation, and/or perform any other action with respect to the cloud service provider. The user interfaces may be presented to the user 101 via a user device 102, such as a laptop.

The user account information 107 associated with the cloud service provider may encompass a comprehensive repository of data that pertains to the services, identity, preferences, usage patterns, and/or the like of the user 101 within the system 100. This information may include, but is not limited to, billing details, service identifiers, service utilization, and regional service specifications, which collectively may provide a nuanced understanding of the cloud-based activities of the user 101. The user account information 107 may also contain other relevant data points, such as user preferences, security settings, and notification configurations, which collectively contribute to a detailed profile of the cloud-based identity of the user 101. For example, the user account information 107 may include information relating to the types of cloud services (e.g., infrastructure as a service, function as a service, and storage as a service) utilized as well as the names of the instances of each type of cloud services utilized.

The user account information 107 may be associated with trajectory information 108 of the user 101. The trajectory information 108 may represent a record of navigation paths within the cloud service provider's resource pages (also referred to herein as "resources"), such as service pages (e.g., pages relating to infrastructure as a service, function as a service, storage as a service, and/or instances thereof) and documentation pages (e.g., pages relating to articles, videos, frequently asked questions, etc.), capturing the specific resources the user 101 has accessed (e.g., via a web browser). The trajectory information 108 may be discretized into sessions (e.g., a contiguous block of time during which the user 101 is engaged with the cloud service provider and their interactions are tracked and recorded to form their trajectory information). Trajectory information 108 may be encoded in a format that facilitates processing by the model 112 where, for example, each page visit may be demarcated by a unique token, such as a "page token", to create a discrete sequence of page identifiers. This sequence effectively reconstructs the user's browsing history, providing a detailed account of the resources (e.g., services and documentation) that the user 101 has interacted with, and enabling the model 112 to generate personalized questions that are contextually relevant to their specific needs and interests.

For example, if a trajectory includes a set of pages on the cloud service visited by the user 101 and each page includes a category and page title, a trajectory may look like:

<trajectory>[VM_1: home], [VM_1: create instance], [VM_1: dashboard], [Storage_vol_1: home], [Storage_vol_1: create_vol]</trajectory>

Additionally, a set of cloud services utilized by the user 101 may be stored in the user account information 107 as:

<cloud_service> [Virtual Machines: [VM_1, VM_2], Functions: [ ], Storage: [Storage_vol_1]</cloud_service>

With this information and/or the user account information 107, it can be predicted what the user 101 might try to accomplish next. This prediction can be leveraged to identify resource(s) (e.g., documents, web pages, etc.) and surface them to the user 101 in the form of a question with a link to the identified resource(s) as the answer. For example, it can be seen in the past trajectory provided above that the user 101 has gone from pages about virtual machine VM_1 to pages about creating a storage volume Storage_vol_1. The system can generate questions such as "how do I connect my VM_1 to my Storage_vol_1?" and/or an answer including a link to the page that can guide the user 101 and/or directly to the area of the VM_1 page in which the user 101 can make such a connection. In some embodiments, the model 112 may be multimodal, allowing for the answers generated to not only be text-based, but also or instead to be visual and/or aural in nature. For example, if the question at issue is "what is the architecture that I am using in my cloud formation software stack?", an answer may be generated including a textual response as well as an image representing a software architecture diagram.

The training 120 and/or inference 110 of the model 112 may occur on the same or different part of the server 104. The training 120 and/or inference 110 may also or instead be performed at least in part on a separate server. The model 112 may be a foundation model that serves as a general-purpose, multimodal foundation for a broad range of downstream machine learning applications, which can be fine-tuned and specialized for various tasks, domains, and/or modalities (e.g., text and images). For example, the model 112 may be a type of sequence-to-sequence model, such as a transformer model, configured to generate a sequence of tokens (e.g., a question) based on a given input sequence (e.g., the user's trajectory information). The model 112 could be a transformer-based encoder and/or decoder model, where the encoder takes in the user's trajectory information and generates a contextualized embedding, and the decoder generates the question based on this embedding. The decoder may use self-attention mechanisms and/or recurrent neural networks (RNNs) to generate the question. In some embodiments, the training 120 may be an offline process and the inference 110 may be an online process. The training 120 may take place periodically (e.g., yearly), and the inference 110 may take place on demand (e.g., when the user 101 logs in). In some embodiments, the model 112 may be multiple models, such as a model for question generation (e.g., a large language model) and a model for answer generation (e.g., a multimodal foundation model).

The training 120 of the model 112 for question generation may involve a multi-step process that combines supervised fine-tuning and specialized datasets. The foundation of the model 112 may be a pre-trained model, which has already acquired a vast understanding of language and context, for example, through self-supervised learning on large text corpuses, such as books, articles, research papers, and websites, allowing the model 112 to learn the patterns and structures of language, including syntax and semantics.

To specialize the model 112 for question generation, the model 112 may be exposed to demonstration datasets specifically designed for question generation tasks. This initial fine-tuning step allows the model 112 to grasp the fundamental patterns and structures inherent in question formation. For example, during the fine-tuning process, the model 112 may be trained on the Stanford question answering dataset (SquAD) to learn how to generate questions that are relevant to a given context.

To tailor the model 112 to the specific domain of documentation and other resources of the cloud service provider as well as user trajectories and account information, the model 112 may be further refined using supervised fine-tuning 122. Supervised fine-tuning 122 may involve manually curated SFT information 124, e.g., input-output pairs, where the input may be user trajectory data, including service usage, service regions, billing information, and/or the like, and the desired output may be relevant questions that a user might ask based on their unique context. By iteratively feeding these input-output examples, the model 112 may learn to associate specific user behaviors and preferences with pertinent questions. Fine-tuning is described in further detail with respect to the discussion of FIG. 4 below.

When the user 101 logs in, starting a new session, the model 112 may be triggered to generate a set of questions that are relevant, for example, to the user's previous session. To achieve this, the model 112 may perform an inference process that leverages the user's trajectory information 108 and/or account information 107. The inference process may begin with an encoder of the model 112, which may receive the user's trajectory information 108 from the previous session and produce an embedding that, for example, captures the user's past behavior and preferences. The encoder's output may be a contextualized embedding that represents the user's trajectory information 108 in a numerical format (e.g., in a vector space). This embedding may then be used to initialize the decoder of the model 112, which may be responsible for generating the questions. The decoder may be a sequence-to-sequence model that takes the contextualized embedding as input and generates a sequence of tokens that form a coherent and relevant question. The decoder may use a combination of RNNs and/or transformers to generate the question. The RNNs may be used to model the sequential dependencies between tokens in the question, while the transformers may be used to capture long-range dependencies and to generate tokens that are coherent and grammatically correct. At each step, the decoder may predict the next token in the sequence based on the previous tokens and the contextualized embedding. The decoder may use a probability distribution over the possible tokens in the vocabulary to generate the next token, and it may select the token with the highest probability. This process may be repeated until the decoder generates a complete question. The question generation process may be repeated for a threshold number of questions. This threshold number of questions may be greater than the number of questions that may ultimately be provided to the user 101 to account for irrelevant questions, hallucinations, and/or otherwise defective questions that may be filtered before providing them to the user 101.

After generating a set of questions based on the trajectory information 108, a filtering mechanism may be employed to select the most relevant and informative questions to present to the user 101. The filtration 114 may reduce the number of questions to a predetermined amount to account for hallucinations, irrelevant questions, and other noise that may have been generated by the model 112, leaving the best questions generated to be provided to the user 101. The filtration 114 may use a combination of natural language processing (NLP) techniques and/or machine learning algorithms to evaluate the quality and/or relevance of each generated question. One approach may be to use a ranking model that scores each question based on its similarity to the user's trajectory information, as well as its coherence, fluency, and/or relevance to the user's previous session. The ranking model can be trained on a dataset of labeled questions, where each question is annotated with a relevance score or a label indicating its quality. Another approach may be to use a classification model that categorizes each question into one of several categories, such as "relevant," "irrelevant," "hallucination," or "uncertain." The classification model can be trained on a dataset of labeled questions, where each question is annotated with a category label. The filtration model can then be used to classify each generated question and filter out those that are deemed irrelevant or of poor quality. The filtration 114 may also or instead use various heuristics and rules to filter out questions that are too similar, vague, or specific. For example, the filtration 114 can use a similarity metric, such as cosine similarity or Jaccard similarity, to identify questions that are too similar to each other and filter out duplicates. The filtration 114 can also or instead use a set of predefined rules to filter out questions that contain certain keywords or phrases that are known to be irrelevant, uninformative, or otherwise inappropriate.

Once the set of questions has been filtered to a threshold number of questions, the answers to each question may be generated in the form of a resource locator. Answers may be provided in the form of a resource or a subset, indication, or derivative thereof. The resource retrieval 116 may retrieve one or more resource locators that may point (e.g., redirect) to a resource that is most likely to contain the answer to the question. A resource locator may be retrieved by comparing the embedding of a question to the embeddings of the resources in the resource index 118. The resource index 118 may be a repository of representations of the available resources, which may be indexed by their resource locator. The resources may each be split up into a predetermined number (e.g., 256) of tokens or significant units. Each token may then be embedded into a numerical vector space, where semantically similar tokens are mapped to nearby points. This allows the system to capture the nuances of language and meaning in each resource and to identify relationships between different resources. After a question is generated and/or filtered, it may be embedded and its embedding may be compared to the embeddings of the resources in the resource index 118. This comparison may be done using a similarity metric, such as cosine similarity or dot product, which measures the degree of similarity between the two embeddings. The resource with the highest similarity score may be identified as the most likely to contain the answer to the question, and its resource locator may be provided as the answer to the question. The resource locator can identify the whole resource and/or the most relevant part of the resource, depending on the level of granularity required. For example, if the question is very specific, the resource locator may point to a specific section or paragraph within a resource that contains the answer. On the other hand, if the question is more general, the resource locator may point to the entire resource or a broader category of resources that are relevant to the question. In some embodiments, answers may also or instead be generated in the form of textual, aural, visual, and/or video content that directly answers or relates the question. One or more multimodal models (which may be or include model 112) may receive a question as input and generate, for example, a summary of a relevant resource (e.g., identified by resource retrieval 116) and/or an image. For example, a question may be "what is the trend in storage used by my VM?" and an image of a graph corresponding to the VM's storage use may be generated in response.

When the user device 102 loads the console and the questions and answers are generated, the questions and answers may be presented on the console for the user 101. The user 101 may be able to quickly find the most relevant resource to questions that they likely would have asked based on their previous session. In some embodiments, the user 101 may click the question or a link provided with the question to access the answer, which may be the resource locator that takes the user 101 to the resource that is most likely to have the information. In some embodiments, the question may be presented along with an answer that includes text or a derivative thereof from the most relevant part of the most relevant resource.

Figure 2:
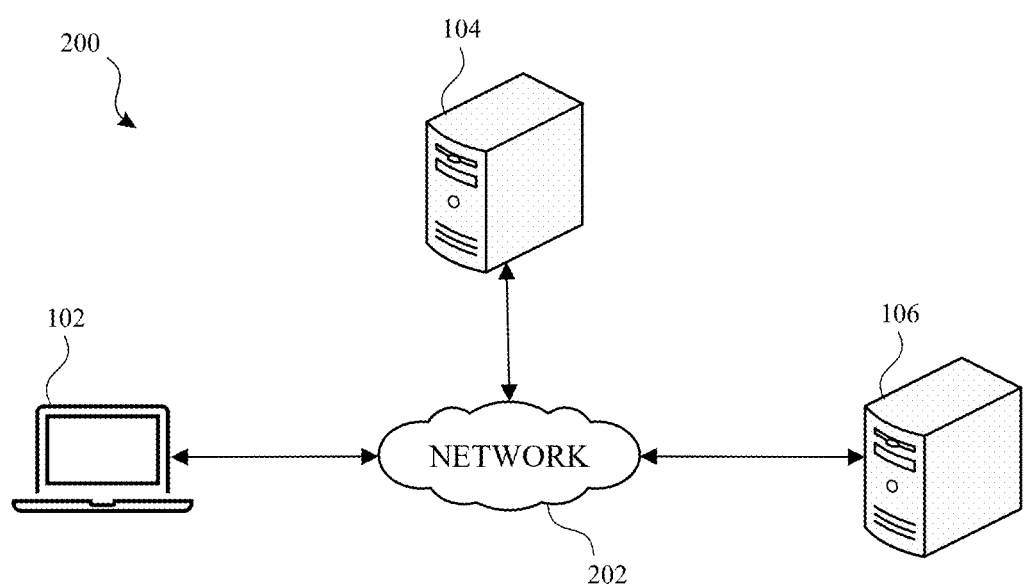
FIG. 2 illustrates an example network configuration of the subject technology, in accordance with one or more embodiments of the subject technology.

FIG. 2 illustrates an example network configuration 200 of the subject technology, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The configuration 200 may generally include a plurality of computing devices and services that are interconnected to exchange data and resources with each other. The configuration 200 may include one or more computing devices, such as a user device 102 and servers 104, 106. The network 202 may communicatively couple (directly or indirectly) the user device 102 and the servers 104, 106. In one or more embodiments, the network 202 may be an interconnected network of devices that may include, or may be communicatively coupled to, the Internet. For explanatory purposes, the configuration 200 is illustrated in FIG. 1 as including the user device 102 and the servers 104, 106; however, the configuration 200 may include any number of electronic devices and/or any number of servers communicatively coupled to each other directly or via the network 202.

The user device 102 may be a compute node and may include all or part of the electronic system discussed below with respect to FIGS. 7-8. The user device 102 may include hardware and/or software for generating user interfaces including one or more visual elements (e.g., user consoles) for providing generated questions to the user (e.g., via an electronic display). The user device 102 may also include hardware and/or software for receiving user inputs to access resources relating to a cloud service provider (e.g., server 104). The user device 102 may also include hardware and/or software for displaying resources relating to a cloud service provider (e.g., server 104).

Figure 7:
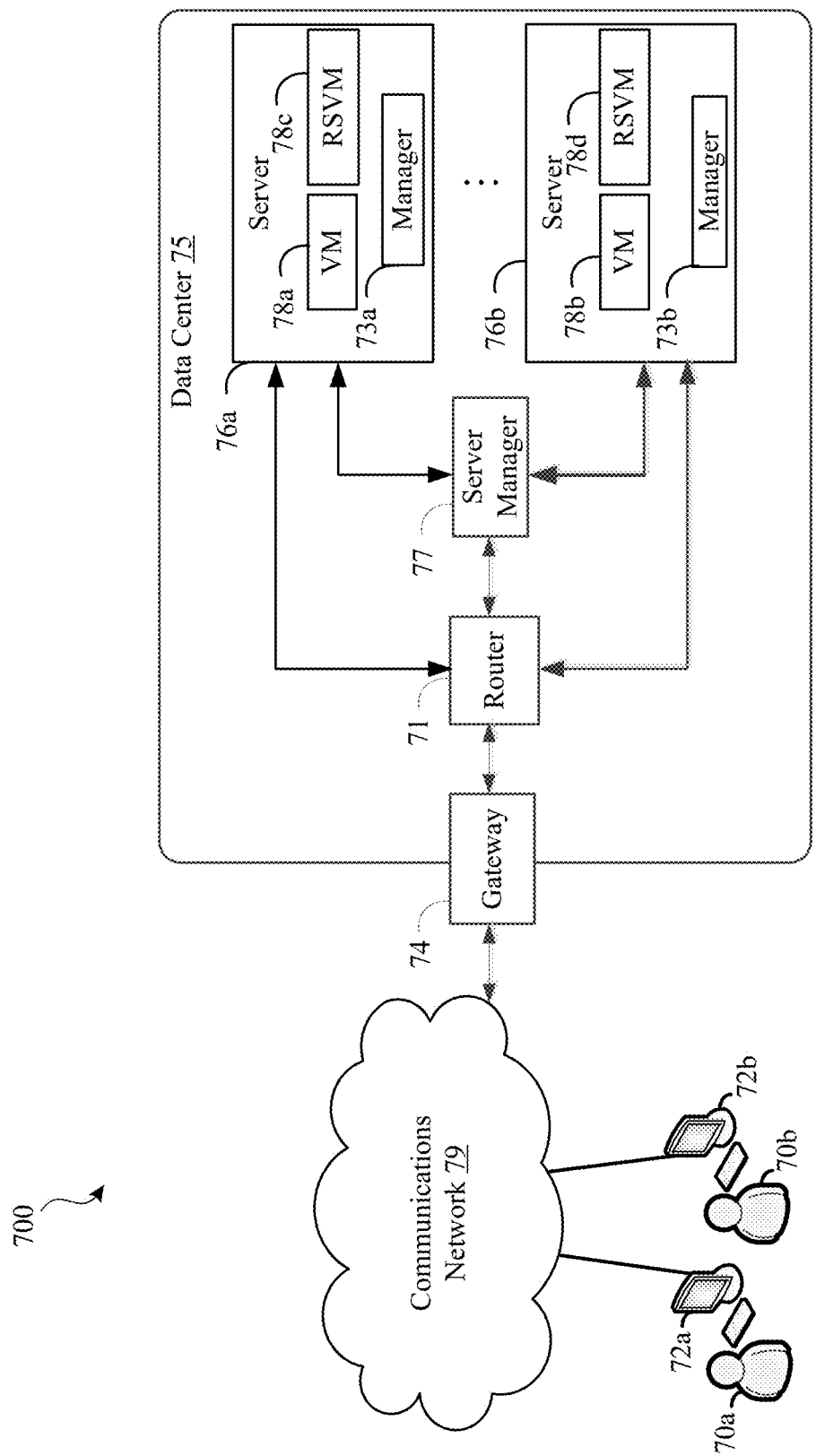
FIG. 7 illustrates an example computing environment in which aspects of the subject technology may be used, in accordance with one or more embodiments of the subject technology.
Figure 8:
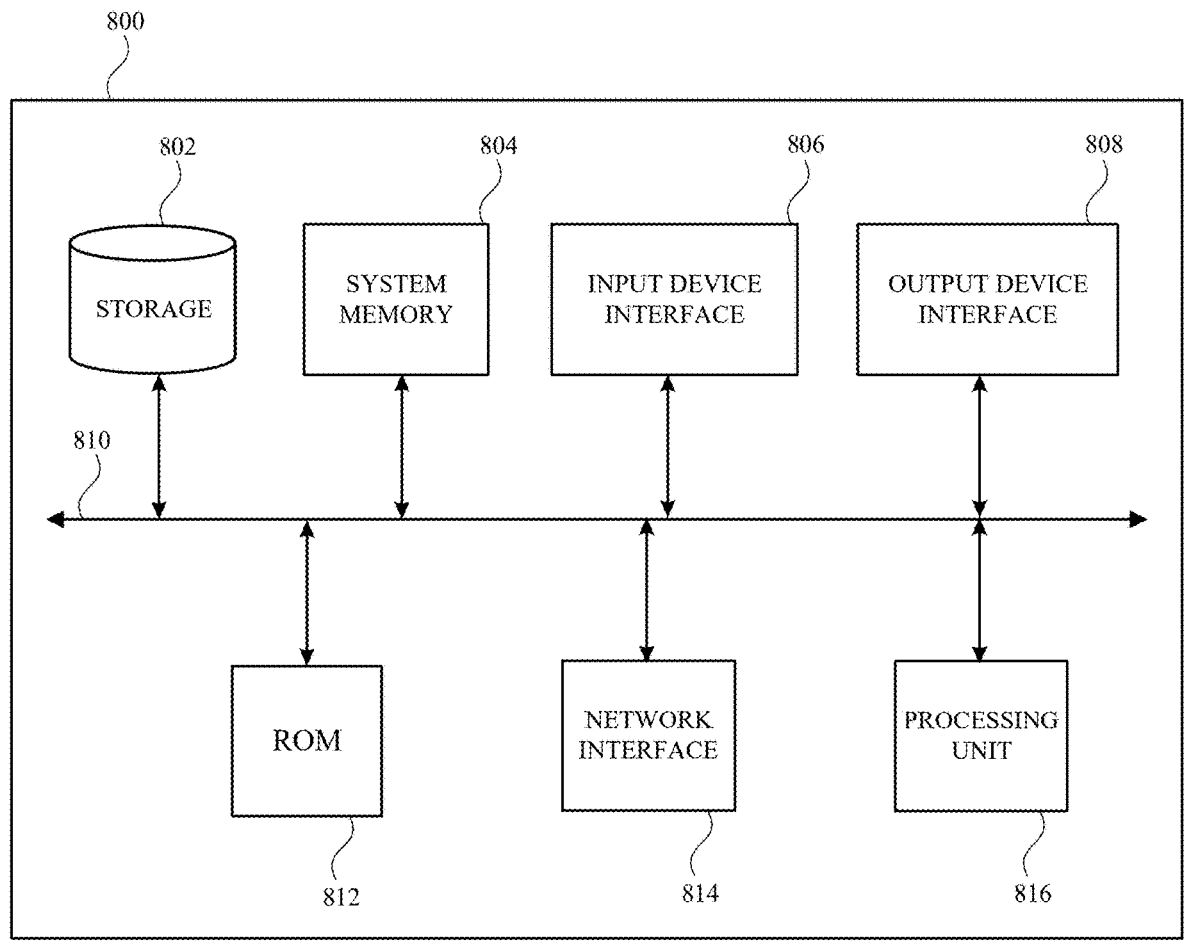
FIG. 8 illustrates an example electronic device in which aspects of the subject technology may be used, in accordance with one or more embodiments of the subject technology.

The server 104 may be a server and may include all or part of the electronic system discussed with respect to FIGS. 7-8. Server 104 may comprise services and other computing features such as large scale storage or serverless processes supported by a cloud service. The server 104 may also include a storage component to store training datasets, supervised fine-tuning datasets, cloud service provider resources, and/or any other form of electronic data. The server 104 may also include one or more machine learning models, such as a foundation model (e.g., model 112), for generating one or more questions and/or answers based on user trajectory information. The server 104 may also include one or more algorithms (e.g., computer-readable instructions), such as clustering algorithms for generating (e.g., clustering via Hierarchical Density-Based Spatial Clustering of Applications with Noise (HDBSCAN)) and/or manipulating (e.g., merging, dividing, visualizing, and the like) clusters, scoring algorithms for generating (e.g., TF-IDF or variants thereof) and/or manipulating (e.g., normalizing) scores associated with clusters or embeddings. In some embodiments, one or more features of the server 104 may be divided between multiple servers, such as server 106. For example, server 104 may be used to store user account information and trajectory information while server 106 may be used to perform model training and inference.

Machine learning techniques, such as those described herein, are often used to form predictions, solve problems, recognize objects in image data for classification, generate text, etc. For example, machine learning techniques described herein may be used to generate questions based on user trajectory information. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between the expected output of the machine learning model and the actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as backpropagation.

As noted, in some examples, all or part of the system may be implemented as a cloud computing service on example of which employs a provider network described in more detail with respect to FIG. 7. Accordingly, a client device (e.g., the user device 102) may make an application programming interface (API) call to such a service (e.g., running on the server 104) to perform one or more processes of the subject technology.

Figure 3:
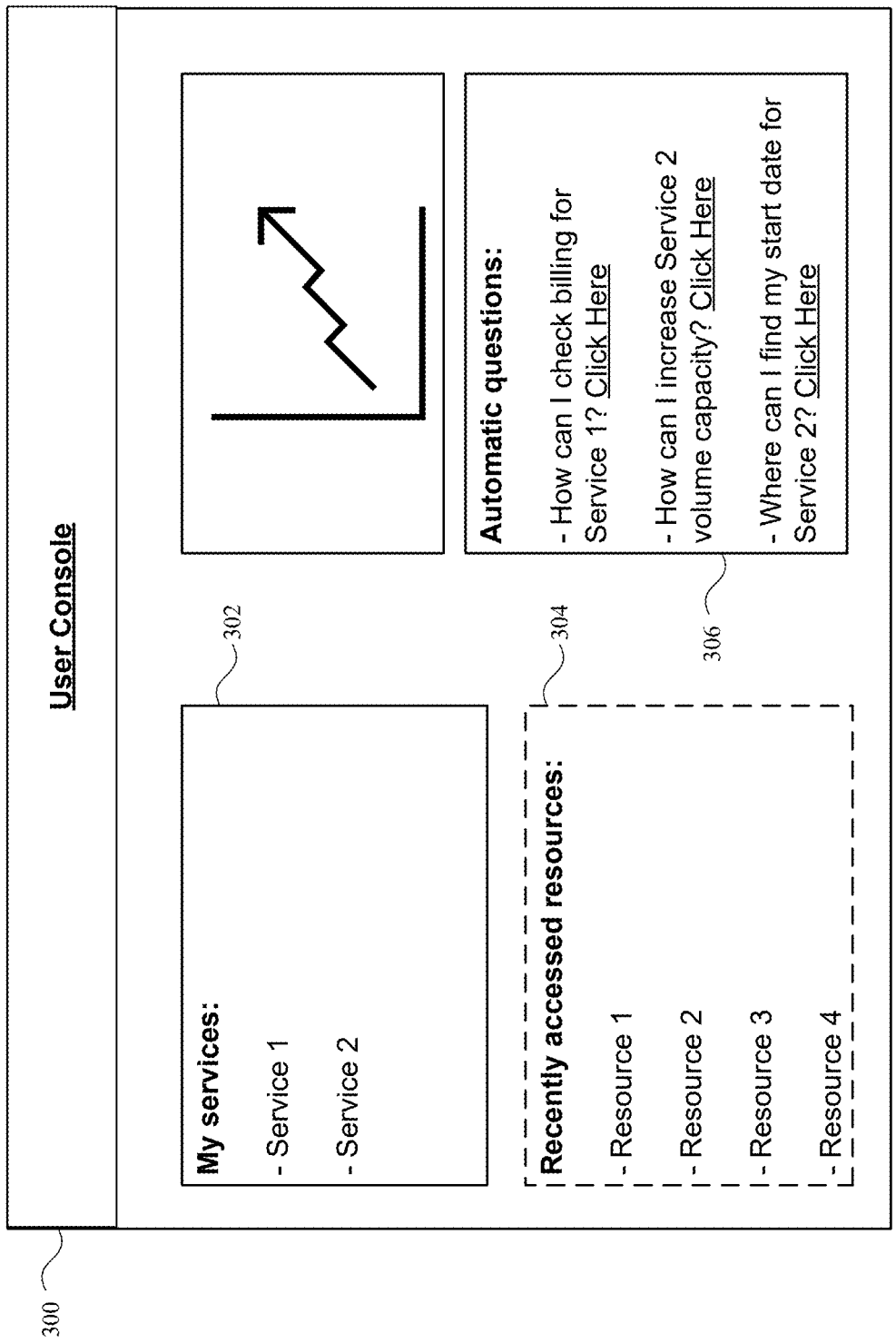
FIG. 3 illustrates an example console user interface, in accordance with one or more embodiments of the subject technology.

FIG. 3 illustrates an example console user interface (UI 300), in accordance with one or more embodiments of the subject technology. The UI 300 may be used to manage cloud services with a cloud service provider. The UI 300 may be designed to provide a comprehensive overview of a user's subscribed services 302 and their associated metrics, allowing the user to monitor, for example, service utilization, performance, and costs at a glance through interactive charts and graphs. The UI 300 may also include a "Recently Accessed Resources" section 304, offering a snapshot of the user's previous interactions with resources from the cloud service provider. The section 304 may serve as a quick reference for frequently used and/or recently used resources and provides a convenient pathway to revisit past activities. For example, the section 304 may show the trajectory of the user's previous session, including the resources that were visited in the order they were visited. In some embodiments, the section 304 may not be presented so as to avoid the possibility of accidental disclosure (e.g., via screen sharing) of potentially sensitive information (e.g., service instance identifiers).

The UI 300 may also include an "automatic questions" widget 306. The widget 306 may present questions and answers generated based on the user's trajectories (e.g., the trajectory from the previous session) and interactions with the cloud service provider. By analyzing a user's activities and preferences, the cloud service provider can predict potential queries and provide direct access to answers, reducing the need for manual searches. For example, if a user has been primarily researching information about the user's cloud service utilization, the widget might suggest questions related to best practices, optimization techniques, or specific functionality queries. These questions may be designed to provide proactive guidance and anticipate users' needs, enhancing their overall cloud service management experience. By integrating the widget 306 into the UI 300, the cloud service provider offers a dynamic knowledge base that adapts to each user's journey. The questions and associated answers may be generated in real time and/or following a session, which not only reduces the time spent searching for information but also empowers users to explore and leverage the full potential of their cloud services.

Figure 4:
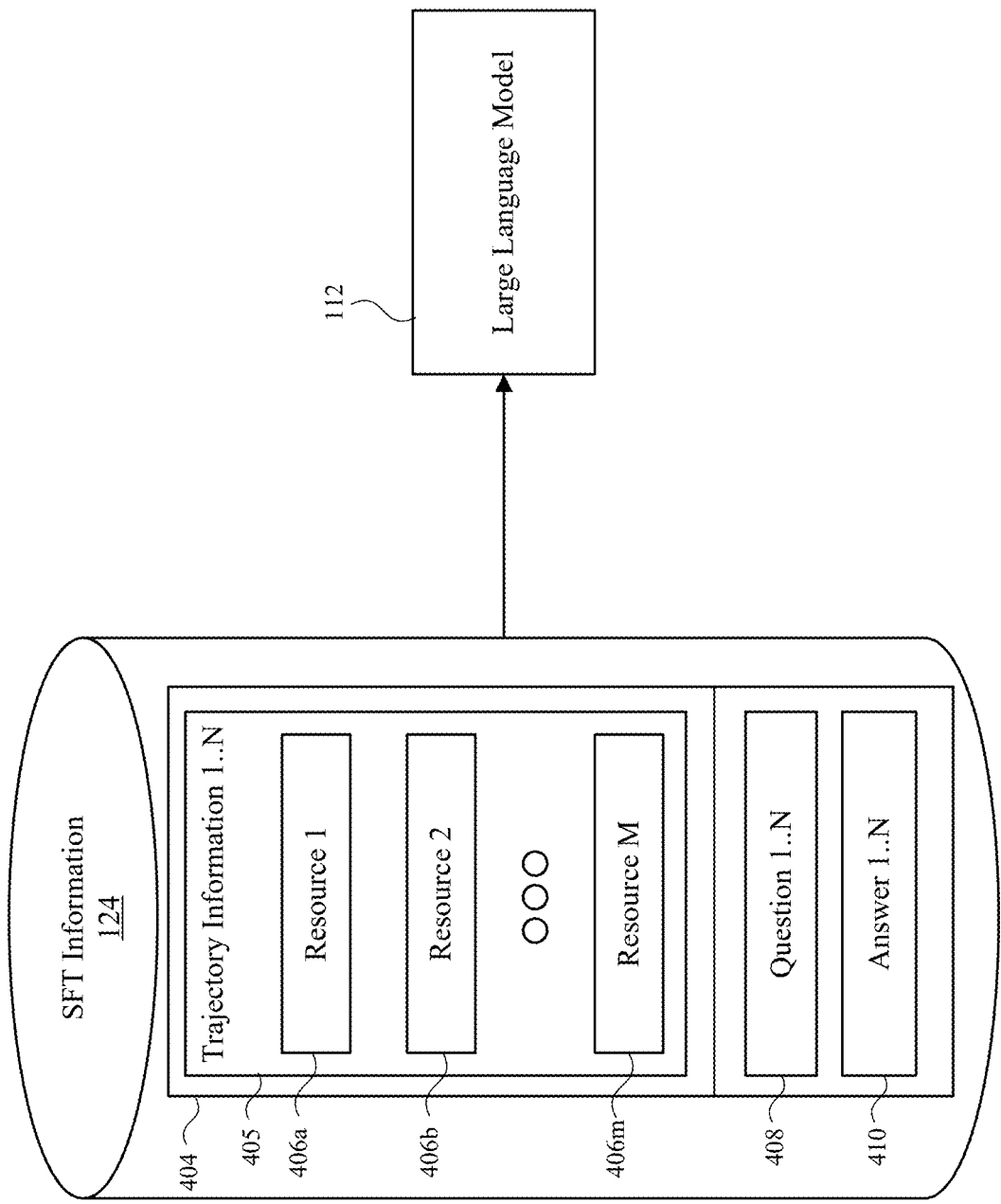
FIG. 4 illustrates an example fine-tuning process, in accordance with one or more embodiments of the subject technology.

FIG. 4 illustrates an example fine-tuning process (e.g., supervised fine-tuning 122), in accordance with one or more embodiments of the subject technology. The manually curated data for fine-tuning the model 112 includes the SFT information 124. The SFT information 124 may include a curated dataset specifically designed to adapt an model 112 for the task of personalized question generation.

The SFT information 124 dataset may include paired input-output examples 404, where the input may represent a user's trajectory information 405 (e.g., including their documentation browsing history and service usage) and the output may correspond to a set of relevant questions 408 that the user is likely to ask based on their trajectories and/or answers 410 that includes at least part of one or more resources that likely include the answer to the corresponding questions. The input data (e.g., trajectory information 405) may be represented as a sequence of tokens, where each token corresponds to a specific page or resource 406a-406m visited by a user, the output questions 408 may be encoded as natural language text, and the output answer 410 may be encoded natural language text, audio, images, and/or resource locators. The examples 404 included in the SFT information 124 may pertain to a diverse range of users, including both novice and experienced users of the cloud service, as well as users with varying levels of expertise and familiarity with different services and resources.

The curation of the SFT information 124 may be a manual process (e.g., performed in advance of training 120) undertaken by human annotators who possess a deep understanding of the cloud service and its documentation. These annotators may carefully review and label user trajectory information, identifying the most relevant and context-specific questions that a user is likely to ask, so that the SFT information 124 is accurate, comprehensive, and representative of real-world usage scenarios. In some embodiments, the SFT information 124 may include trajectory information, questions, and/or answers previously generated by the fine-tuned model 112, which may have associated feedback provided by the user that may have been used to curate the information.

Figure 5:
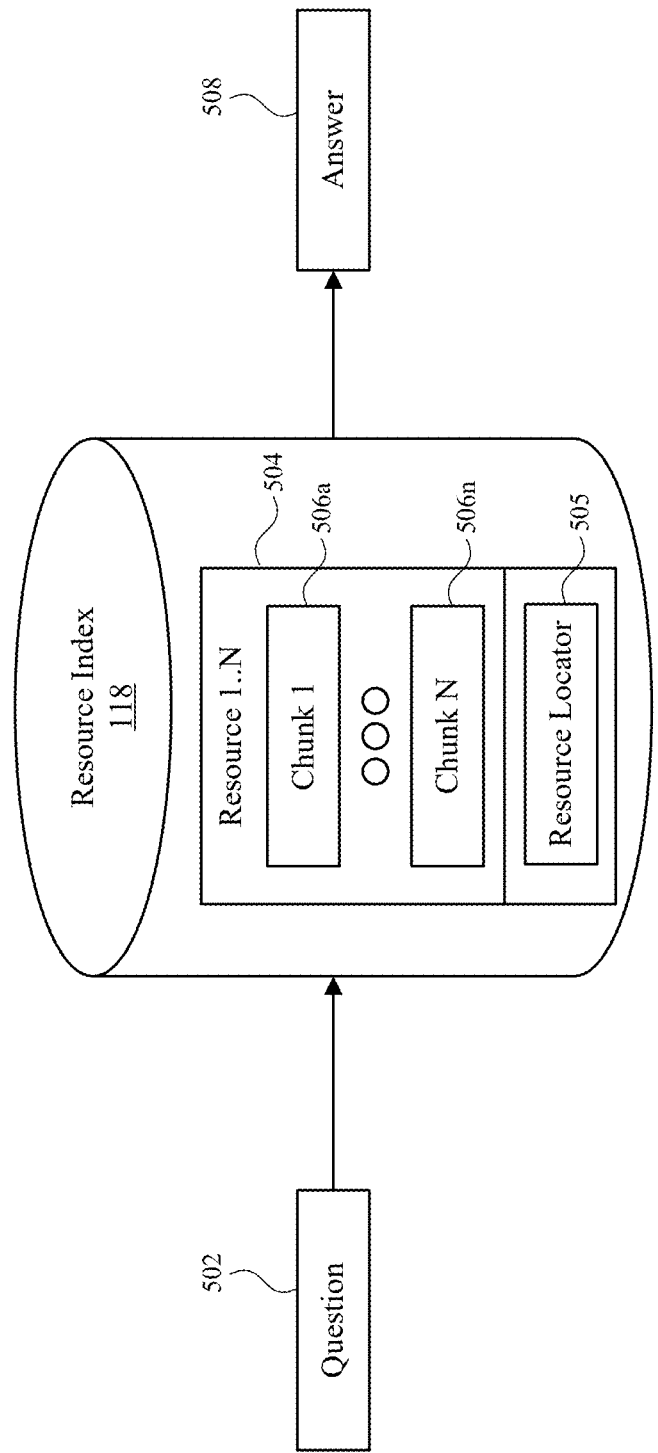
FIG. 5 illustrates an example resource retrieval process, in accordance with one or more embodiments of the subject technology.

FIG. 5 illustrates an example resource retrieval process (e.g., resource retrieval 116), in accordance with one or more embodiments of the subject technology. The resource retrieval process may involve efficiently matching generated questions to resources 504, which can include documents, knowledge base articles, tutorials, and the like stored in the resource. By chunking and indexing these resources in the resource index 118, the system can retrieve the most pertinent information in response to a generated question.

The resources 504 may be processed and divided into smaller segments, or "chunks," for example, using the same tokenizer that the underlying model (e.g., model 112) is trained on. Tokenization breaks the resources down into meaningful units, such as words or subwords, preserving the contextual relationships between them. The number of tokens per chunk may be predetermined (e.g., 256) to strike a balance between granularity and comprehensiveness.

Each chunk may then be passed through an embedding layer, converting the textual data into dense numerical vectors. The embeddings may capture the semantic meaning of the chunks, allowing for efficient comparison and similarity calculations. The embedded chunks 506a-506n may be stored in the resource index 118, a data structure optimized for rapid retrieval based on vector similarity.

After a question 502 is generated, it too may undergo a similar embedding process, converting it into a vector representation. The embedded question may then be used to query the resource index 118, initiating a search for the most similar chunk. The resource index 118 may calculate the similarity between the question vector and each chunk vector using similarity metrics, such as cosine similarity or Euclidean distance.

Upon identifying the chunk with the highest similarity to the question 502, the system may determine the appropriate response. In some cases, the system may provide a direct link to the resource (e.g., resource locator 505), allowing users to access the documentation or knowledge base article (or specific portion thereof) that addresses the generated question. In some embodiments, the system may utilize NLP techniques to summarize the documentation or chunk, providing a summary as the answer. The choice between providing a resource locator or a summary may depend on the nature of the question and/or the structure of the resource. For example, for questions seeking a particular location (e.g., a resource modification page), a direct link to the relevant section may be more useful. On the other hand, for broader queries or when the most pertinent information is dispersed throughout the chunk, a summary might be more appropriate.

Figure 6:
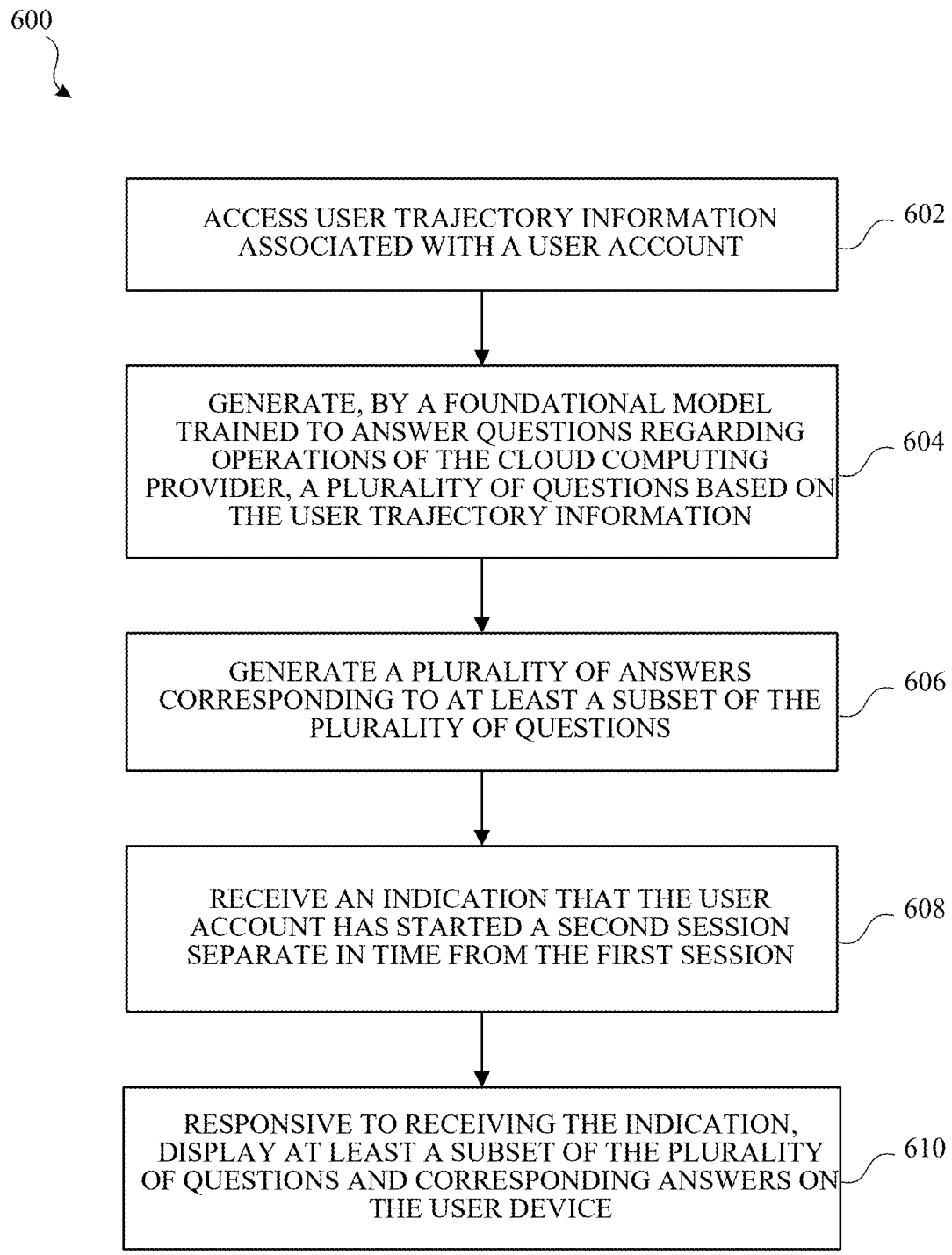
FIG. 6 illustrates a flow diagram of an exemplary process for documentation question generation, in accordance with one or more embodiments of the subject technology.

FIG. 6 illustrates a flow diagram of an exemplary process 600 for question generation, in accordance with one or more embodiments of the subject technology. For explanatory purposes, the process 600 is primarily described herein with reference to FIGS. 1-5. However, the process 600 is not limited to the items shown in FIGS. 1-5, and one or more blocks (or operations) of the process 600 may be performed by one or more other components of other suitable devices. Further, for explanatory purposes, the blocks of the process 600 are described herein as occurring serially or linearly. However, multiple blocks of the process 600 may occur in parallel. In addition, the blocks of the process 600 need not be performed in the order shown and/or one or more blocks of the process 600 need not be performed and/or may be replaced by other operations.

At block 602, a server (e.g., server 104) of a cloud service provider may run a service for question generation. The service may be a process, program, or other software configured to perform the operations described herein. The service may access user trajectory information (e.g., trajectory information 108) associated with a user account (e.g., user 101). The user trajectory information may be stored at the server and may correspond to user interactions with the cloud service provider. For example, in a user session, a user may access one or more resources of the cloud service provider. A user trajectory information for the session may be a chronological list of the resources accessed by the user. The list of the resources may include the names of the resources accessed by the user.

At block 604, a foundation model (e.g., model 112) on the cloud service provider may generate a plurality of questions based on the user trajectory information. In some embodiments, the model 112 may be an LLM. Before the model 112 is used to generate questions, the model 112 may be pre-trained on large corpuses of text data, such as books, articles, and websites, e.g., using a masked language modeling objective. Pre-training the model 112 may enable the model 112 to learn the patterns and structures of language, such as syntax, semantics, and pragmatics. Subsequently, the model 112 may be fine-tuned on a specific question answering dataset, such as SquAD or TriviaQA, using a supervised learning approach. In this phase, the model 112 may be presented with a question and a corresponding passage or context and may be tasked with generating an answer. The model 112 may be further fine-tuned on information relating to the cloud service provider's resources (e.g., SFT information 124) such as pairings of user trajectories and questions relating to the cloud service provider.

To generate the plurality of questions, the model 112 may receive as input user account information 107 and/or user trajectory information 108 after the user's session ends and/or the user starts a new session. The model 112 may generate a question and may repeat the question generation process until a predetermined number of questions have been generated.

At block 606, the service may generate one or more answers corresponding to each generated question. The answers may correspond to a resource of the cloud computing provider that addresses the corresponding question. The answer may be at least part of the resource, a derivative (e.g., a summary) of at least part of the resource, and/or a resource locator that may direct the user to the relevant resource.

To identify the relevant resource, the service may identify a resource embedding (e.g., resource 504) from a resource index 118 based on an embedding of the question. The resource index may include a plurality of resource embeddings associated with a plurality of resources and/or portions thereof. Identifying a relevant resource may include generating a similarity score (e.g., cosine similarity) between resource embeddings and the question embedding and selecting the resource with the highest similarity score.

Once the relevant resource is identified, the service may access a resource locator of the resource associated with the resource embedding. The answer may include the resource locator. Additionally or alternatively, the service may access the resource at the resource locator and the answer may include at least some of the resource.

In some embodiments, the answers may also or instead include audio, images, and/or video generated by the model 112. For example, the model 112 may output a diagram as an answer to a question about storage utilization.

In some embodiments, prior to generating the one or more answers, the service may filter the generated questions to a threshold number of questions. The service may utilize NLP techniques and/or heuristics to discard questions that are irrelevant, erroneous, lengthy, or otherwise inappropriate. For example, if a question relates to a service that the user is not subscribed to, the question may be discarded.

At block 608, the service may receive an indication or detect that the user account has started a second session. For example, when the user device 102 loads the console (e.g., UI 300), the user device 102 may login to the user account associated with the service and/or may send web requests to the service to access the console. As another example, when the user device 102 is already logged into the user account, the second session may be started after a predetermined period of time has lapsed since the user 101 last accessed a resource (e.g., documentation, FAQs, help documents, etc.) of the cloud service provider.

At block 610, when the service has received the indication or otherwise determined that the user account has started the second session, the service may provide the questions and/or answers to the user device 102 for display to the user 101 (e.g., at widget 306). The questions may be the top predetermined number of questions generated by the service for the previous session and the answers may include locators (e.g., URLs), excerpts, summarizes, copies, or other variations of the resource most relevant to the corresponding question. For example, the web browser of the user device (e.g., user device 102) may send a request to the service on the cloud service provider for questions to populate an automatic questions widget (e.g., widget 306). The service may generate the questions and answers as described herein and generate a response to the user device, which includes the questions and answers. When the response is received, the web browser may populate the widget with the questions and answers. In some embodiments, the answer is a link embedded in or provided with the question. In some embodiments, the answer is also or instead the resource or an excerpt, summary, or other derivative thereof.

FIG. 7 illustrates an example computing environment 700 in which aspects of the disclosed malware signature generation system may be used, in accordance with one or more embodiments of the subject technology. In some embodiments, the server 104 may be a data center 75. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as computer 72 or in the plural as computers 72) via a communications network 79. Data center 75 may be configured to provide computing resources for executing applications on a permanent or as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include distribution and modification virtual machines (DMVM's) 79*a-b*, which are virtual machines that are configured to execute any, or all, of the dynamic messaging group distribution and modification techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring still to FIG. 7, the network 79 may, for example, be a publicly accessible network of linked networks and possibly operated by various distinct parties, such as the Internet. In other embodiments, communications network 79 may be a private network, such as a corporate or university network that is wholly or partially inaccessible to non-privileged users. In still other embodiments, communications network 79 may include one or more private networks with access to and/or from the Internet.

Communication network 79 may provide access to computers 72. User computers 72 may be computers utilized by users 70 or other customers of data center 75. For instance, user computer 72*a* or 72*b* may be a server, a desktop or laptop personal computer, a tablet computer, a wireless telephone, a personal digital assistant (PDA), an e-book reader, a game console, a set top box or any other computing device capable of accessing data center 75. User computer 72*a* or 72*b* may connect directly to the Internet (e.g., via a cable modem or a Digital Subscriber Line (DSL)). In some examples, the user device 102 may be a user computer 72*a*. Although only two user computers 72*a* and 72*b* are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73*a* or 73*b* (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of embodiments can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76*a* and 76*b*. Router 71 may also be connected to gateway 74, which is connected to communications network 79. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a server manager 77 is also employed to at least in part direct various communications to, from and/or between servers 76*a* and 76*b*. While FIG. 7 depicts router 71 positioned between gateway 74 and server manager 77, this is merely an exemplary configuration. In some cases, for example, server manager 77 may be positioned between gateway 74 and router 71. Server manager 77 may, in some cases, examine portions of incoming communications from user computers 72 to determine one or more appropriate servers 76 to receive and/or process the incoming communications. Server manager 77 may determine appropriate servers to receive and/or process the incoming communications based on factors such as an identity, location, or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 77 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other embodiments might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned differently) without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

FIG. 8 illustrates an example electronic system 800 in which aspects of the present disclosure may be implemented, in accordance with one or more embodiments of the subject technology. The electronic system 800 may be, and/or may be a part of, a computing device (e.g., user device 102 and/or server 104). The electronic system 800 may include various types of computer-readable media and interfaces for various other types of computer-readable media. The electronic system 800 may include a bus 810, a storage device 802, a system memory 804, an input device interface 806, an output device interface 808, a ROM 812, a network interface 814, and a processing unit 816, or subsets and variations thereof. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

Network interface 814 may be configured to allow data to be exchanged between the electronic system 800 and devices attached to a network or networks (e.g., communications network 79), such as other computer systems or devices. In various embodiments, network interface 814 may support communication via any suitable wired or wireless general data networks, such as types of Ethernet networks, for example. Additionally, network interface 814 may support communication via telecommunications/telephony networks, such as analog voice networks or digital fiber communications networks, via storage area networks such as Fiber Channel SANs (storage area networks) or via any other suitable type of network and/or protocol.

The bus 810 collectively represents all system, peripheral, and chipset buses that communicatively connect the numerous internal devices of the electronic system 800. In one or more embodiments, the bus 810 communicatively connects the processing unit 816 with the other components of the electronic system 800 (e.g., the ROM 812, the system memory 804, and the persistent storage device 802). From various memory units, the processing unit 816 retrieves instructions to execute and data to process in order to execute the operations of the subject disclosure. The processing unit 816 may be a controller and/or a single- or multi-core processor or processors in various embodiments.

The ROM 812 may store static data and instructions that are needed by the one or more processing unit(s) 816 and other modules of the electronic system 800. The storage device 802, on the other hand, may be a read-and-write memory device. The storage device 802 may be a non-volatile memory unit that stores instructions and data (e.g., static and dynamic instructions and data) even when the electronic system 800 is off. Data may include one or more long-term data stores (e.g., databases). In one or more embodiments, a mass-storage device (such as a magnetic or optical disk and its corresponding disk drive) may be used as the storage device 802. In one or more embodiments, a removable storage device (such as a flash drive, and its corresponding disk drive) may be used as the storage device 802. Generally speaking, a computer-accessible medium may include non-transitory storage media or memory media, such as magnetic or optical media.

Like the storage device 802, the system memory 804 may be a read-and-write memory device. However, unlike the storage device 802, the system memory 804 may be a volatile read-and-write memory, such as random-access memory. The system memory 804 may store any of the instructions and data that one or more processing unit 816 may need at runtime to perform operations. Data may include one or more short-term data stores (e.g., caches and buffers). In one or more embodiments, the processes of the subject disclosure are stored in the system memory 804 and/or the storage device 802. From these various memory units, the one or more processing unit 816 retrieves instructions to execute and data to process in order to execute the processes of one or more embodiments, discussed below.

Embodiments within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general-purpose or special-purpose computing device, including any processing electronics and/or processing circuitry capable of executing instructions. For example, without limitation, the computer-readable medium may include any transitory semiconductor memory (e.g., the system memory 804), such as RAM, DRAM, SRAM, T-RAM, Z-RAM, and TTRAM. The computer-readable medium also may include any non-transitory semiconductor memory (e.g., the storage device 802), such as ROM, SSD, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more embodiments, the tangible computer-readable storage medium may be directly coupled to a computing device, while in other embodiments, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

The bus 810 also connects to the input device interface 806 and output device interface 808. The input device interface 806 enables the system to receive inputs. For example, the input device interface 806 allows a user to communicate information and select commands on the electronic system 800. The input device interface 806 may be used with input devices such as keyboards, mice, dials, switches, sliders, and other interfaces (physical or virtual) for a user to supply information to the electronic system 800. The output device interface 808 may be used with output devices such as displays, speakers, and other interfaces (physical or virtual) for the computing electronic system 800 to provide information. One or more embodiments may include devices that function as both input and output devices, such as a touchscreen.

The bus 810 also couples the electronic system 800 to one or more networks and/or to one or more network nodes through the network interface 814. The network interface 814 may include one or more interfaces that allow the electronic system 800 to be a part of a network of computers (e.g., a local area network (LAN), a wide area network (WAN), or a network of networks (the Internet)). For example, the network interface 814 may include a network interface card (NIC).

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some embodiments; in other embodiments, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some embodiments inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

The predicate words "configured to," "operable to," and "programmed to" do not imply any particular tangible or intangible modification of a subject but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, which applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

What is claimed is:

1. A method, comprising:
   accessing, by a service, user trajectory information associated with a user account, wherein the user trajectory information corresponds to a first session, the first session including user interactions with a cloud computing provider;
   generating, by a foundation model, a plurality of questions based on the user trajectory information, wherein the foundation model is fine-tuned with a fine-tuning dataset comprising a plurality of user trajectories and a corresponding plurality of questions, each of the corresponding plurality of questions relating to a resource of the cloud computing provider;

for at least a subset of the plurality of questions, generating, by the service, a plurality of answers corresponding to the at least the subset of the plurality of questions, wherein an answer of plurality of answers corresponds to the resource of the cloud computing provider;

receiving, by the service and from a user device associated with the user account, an indication that the user account has started a second session separate in time from the first session; and responsive to receiving the indication, causing, by the service, display of the at least the subset of the plurality of questions and corresponding answers on the user device.

2. The method of claim 1, wherein the user trajectory information includes a set of names corresponding to one or more resources accessed by the user account on the cloud computing provider in the first session.

3. The method of claim 1, further comprising filtering the plurality of questions to a threshold number of questions.

4. The method of claim 1, wherein generating the plurality of answers comprises:
identifying, by the service, a resource embedding from a resource index based on an embedding of a respective question of the at least the subset of the plurality of questions, wherein the resource index includes a plurality of resource embeddings associated with a plurality of resources;
accessing, by the service and from the resource index, a resource locator of a resource associated with the resource embeddings; and
generating, by the service, a respective answer associated with the respective question, the respective answer including at least the resource locator.

5. The method of claim 4, wherein each resource in the resource index corresponds to one or more resource embeddings, each resource embedding of the one or more resource embeddings corresponding to a subset of the resource.

6. The method of claim 4, wherein identifying the resource embedding from the resource index based on the embedding of the respective question comprises:
generating a similarity score between the embedding of the respective question and each of the plurality of resource embeddings; and
selecting the resource embedding having a highest similarity score.

7. The method of claim 4, wherein the resource locator redirects the user device to the corresponding resource during the second session.

8. A system, comprising:
a processor configured to perform operations comprising:
accessing, by a service running on the system, user trajectory information associated with a user account, wherein the user trajectory information corresponds to a first session, the first session including user interactions with a cloud computing provider;
generating, by a foundation model trained to answer questions regarding operations of the cloud computing provider, a plurality of questions based on the user trajectory information;
for at least a subset of the plurality of questions, generating, by the service, a plurality of answers corresponding to the at least the subset of the plurality of questions, wherein an answer of plurality of answers corresponds to a resource of the cloud computing provider;
receiving, by the service and from a user device associated with the user account, an indication that the user account has started a second session separate in time from the first session; and
responsive to receiving the indication, causing, by the service, display of the at least the subset of the plurality of questions and corresponding answers on the user device.

9. The system of claim 8, wherein the user trajectory information includes a set of names corresponding to one or more resources accessed by the user account on the cloud computing provider in the first session.

10. The system of claim 8, wherein the foundation model is fine-tuned with a fine-tuning dataset comprising a plurality of user trajectories and a corresponding plurality of questions, each of the corresponding plurality of questions relating to a resource of the cloud computing provider.

11. The system of claim 8, further comprising filtering the plurality of questions to a threshold number of questions.

12. The system of claim 8, wherein generating the plurality of answers comprises:
identifying, by the service, a resource embedding from a resource index based on an embedding of a respective question of the at least the subset of the plurality of questions, wherein the resource index includes a plurality of resource embeddings associated with a plurality of resources;
accessing, by the service and from the resource index, a resource locator of a resource associated with the resource embeddings; and
generating, by the service, a respective answer associated with the respective question, the respective answer including at least the resource locator.

13. The system of claim 12, wherein each resource in the resource index corresponds to one or more resource embeddings, each resource embedding of the one or more resource embeddings corresponding to a subset of the resource.

14. The system of claim 12, wherein identifying the resource embedding from the resource index based on the embedding of the respective question comprises:
generating a similarity score between the embedding of the respective question and each of the plurality of resource embeddings; and
selecting the resource embedding having a highest similarity score.

15. The system of claim 12, wherein the resource locator redirects the user device to the corresponding resource during the second session.

16. A non-transitory computer-readable medium, comprising:
one or more instructions that, when executed by one or more processors, cause the one or more processors to perform operations comprising:
accessing, by a service executed via the one or more processors, user trajectory information associated with a user account, wherein the user trajectory information corresponds to a first session, the first session including user interactions with a cloud computing provider;
generating, by a foundation model trained to answer questions regarding operations of the cloud computing provider, a plurality of questions based on the user trajectory information;

filtering the plurality of questions to a subset of the plurality of questions, the subset of the plurality of questions comprising a threshold number of questions;

for at least a subset of the plurality of questions, generating, by the service, a plurality of answers corresponding to the at least the subset of the plurality of questions, wherein an answer of plurality of answers corresponds to a resource of the cloud computing provider;

receiving, by the service and from a user device associated with the user account, an indication that the user account has started a second session separate in time from the first session; and responsive to receiving the indication, causing, by the service, display of the at least the subset of the plurality of questions and corresponding answers on the user device.

17. The non-transitory computer-readable medium of claim 16, wherein the user trajectory information includes a set of names corresponding to one or more resources accessed by the user account on the cloud computing provider in the first session.

18. The non-transitory computer-readable medium of claim 16, wherein the foundation model is fine-tuned with a fine-tuning dataset comprising a plurality of user trajectories and a corresponding plurality of questions, each of the corresponding plurality of questions relating to a resource of the cloud computing provider.

19. The non-transitory computer-readable medium of claim 16, wherein generating the plurality of answers comprises:

identifying, by the service, a resource embedding from a resource index based on an embedding of a respective question of the at least the subset of the plurality of questions, wherein the resource index includes a plurality of resource embeddings associated with a plurality of resources;

accessing, by the service and from the resource index, a resource locator of a resource associated with the resource embeddings; and generating, by the service, a respective answer associated with the respective question, the respective answer including at least the resource locator.

20. The non-transitory computer-readable medium of claim 19, wherein each resource in the resource index corresponds to one or more resource embeddings, each resource embedding of the one or more resource embeddings corresponding to a subset of the resource.

\* \* \* \* \*